Sept. 13, 1938.  B. JOHNSEN  2,129,770
LIQUID DISPENSING
Filed Dec. 15, 1937   7 Sheets-Sheet 3
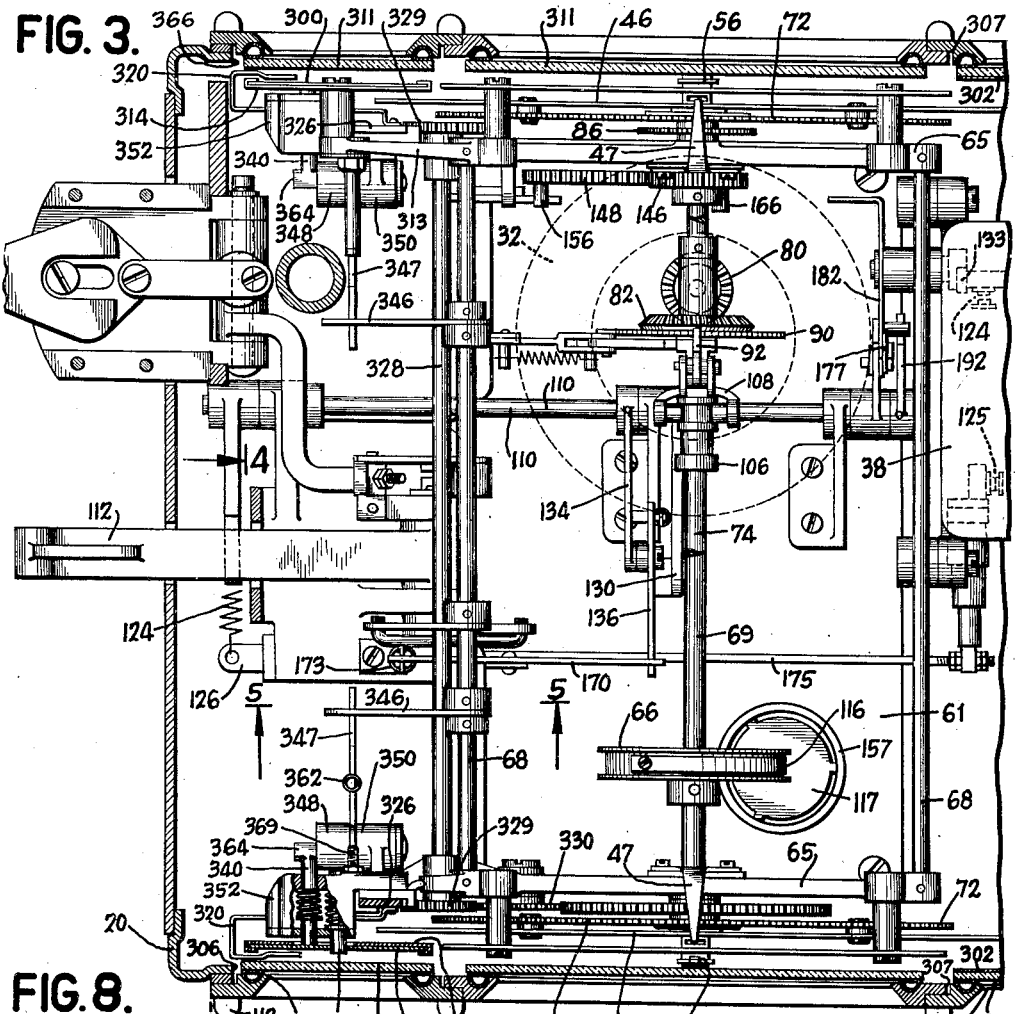
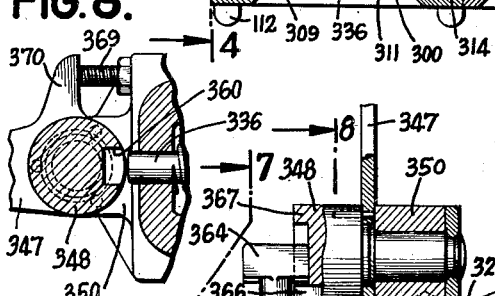
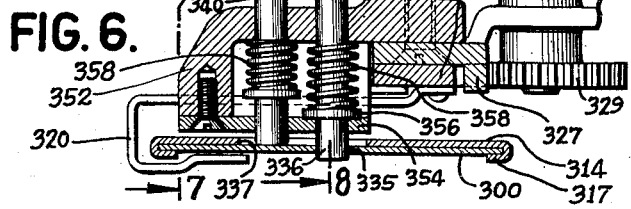
INVENTOR
BJORNULF JOHNSEN
BY
Orton and Griswold
ATTORNEYS Sept. 13, 1938.  B. JOHNSEN  2,129,770
LIQUID DISPENSING
Filed Dec. 15, 1937  7 Sheets-Sheet 4
FIG. 4.
FIG. 5.
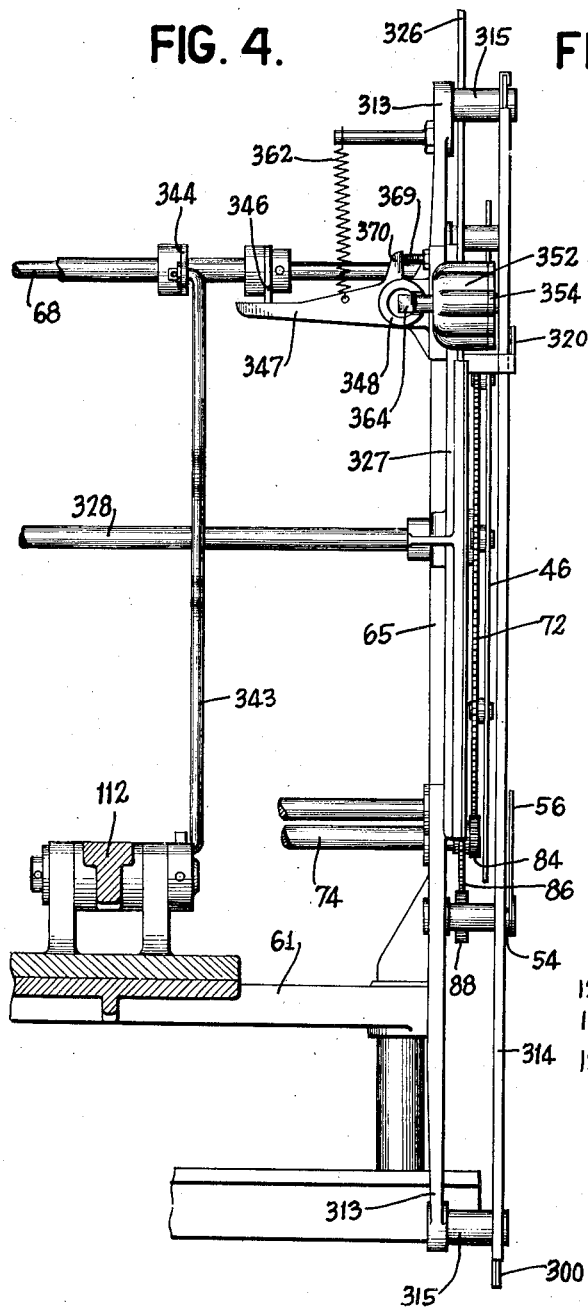
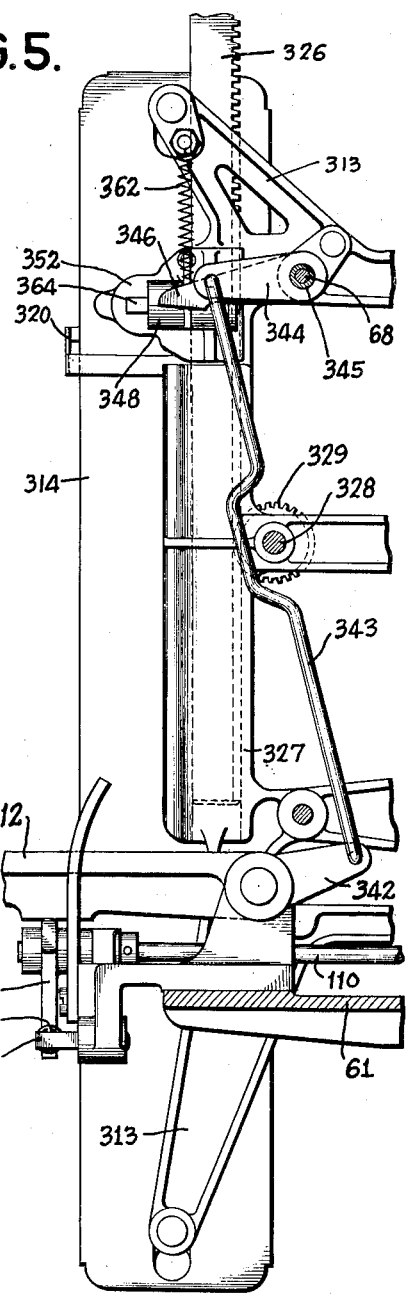
INVENTOR
BJORNULF JOHNSEN
BY
Acton and Griswold
ATTORNEYS

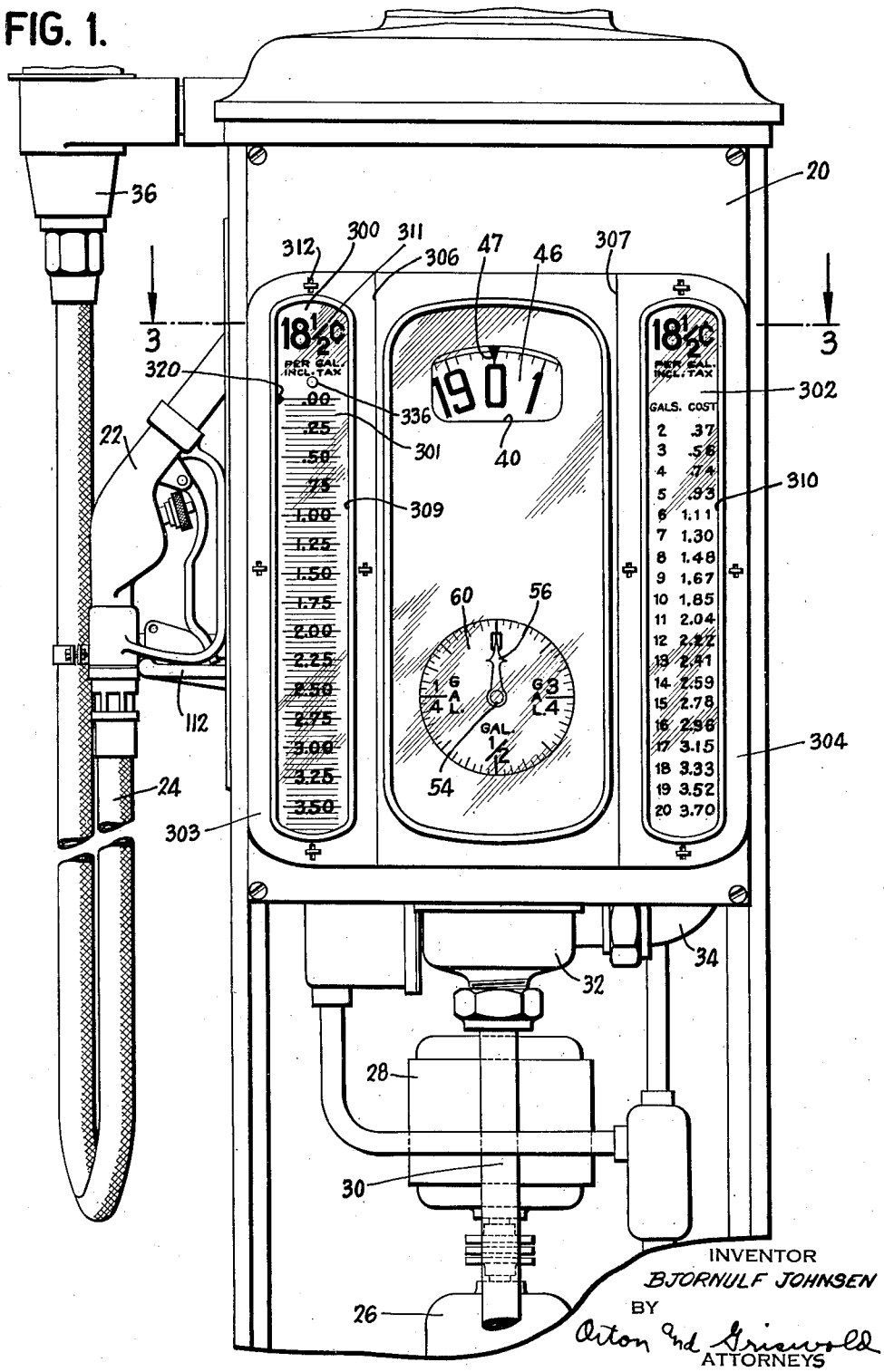

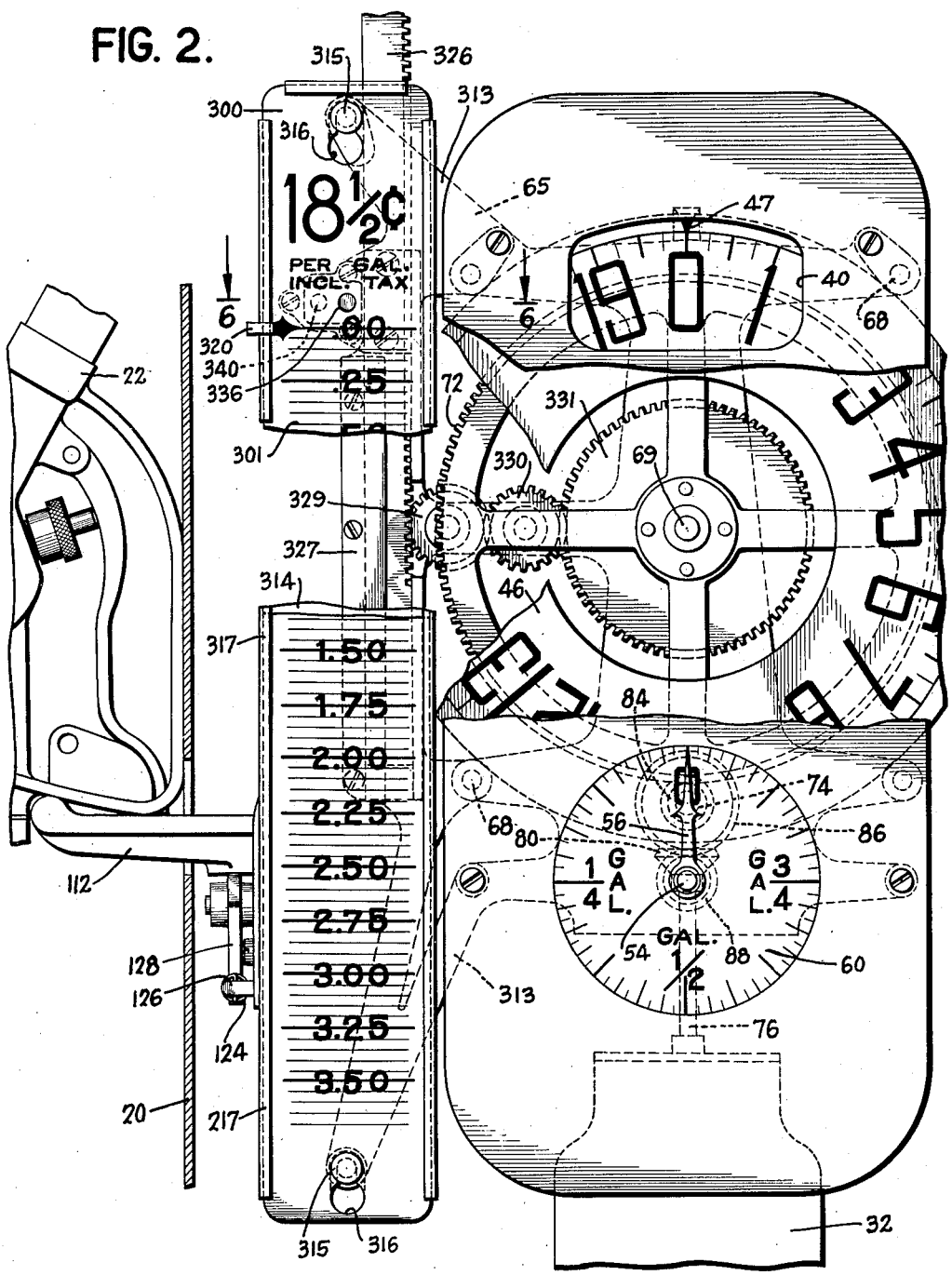

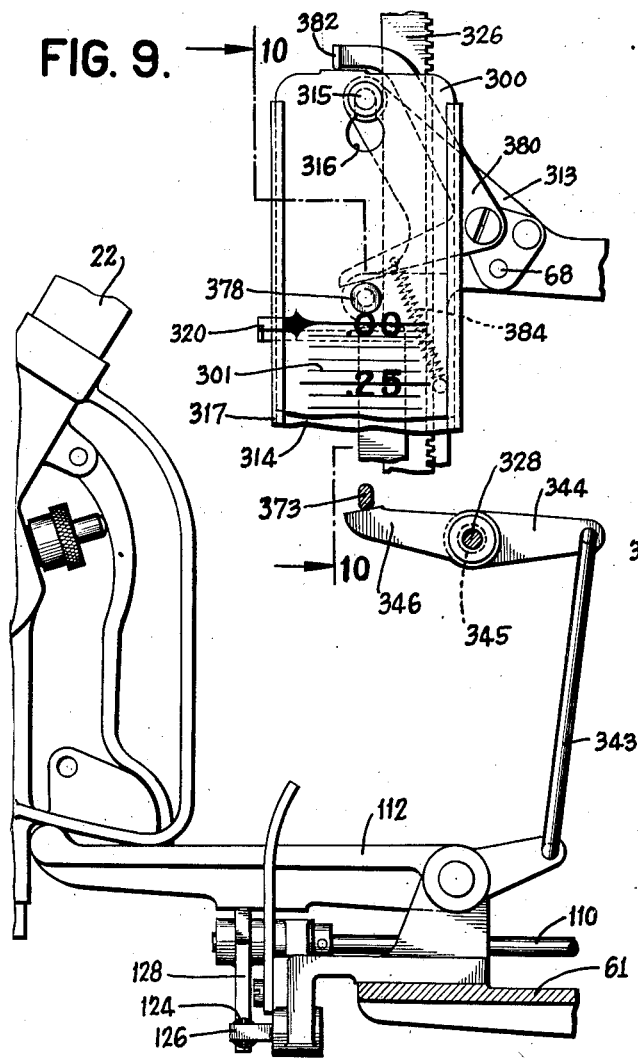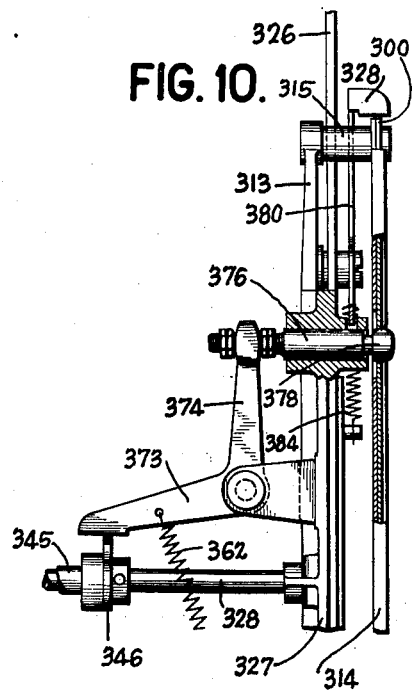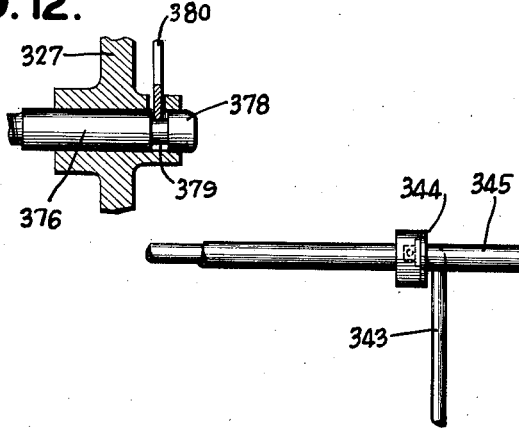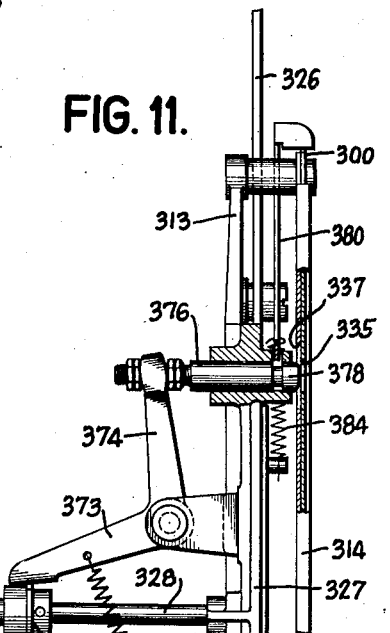

Sept. 13, 1938.                    B. JOHNSEN                    2,129,770
                              LIQUID DISPENSING
                          Filed Dec. 15, 1937            7 Sheets-Sheet 6
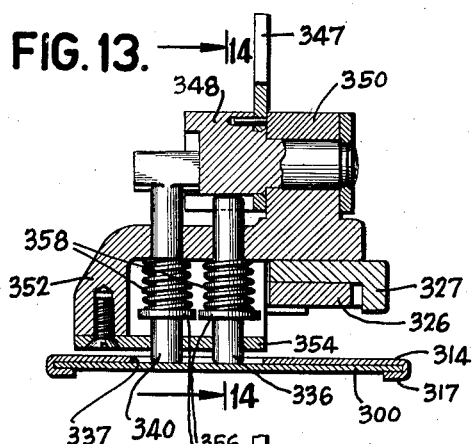
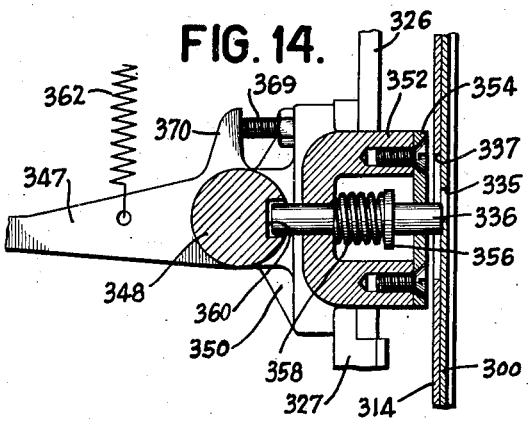
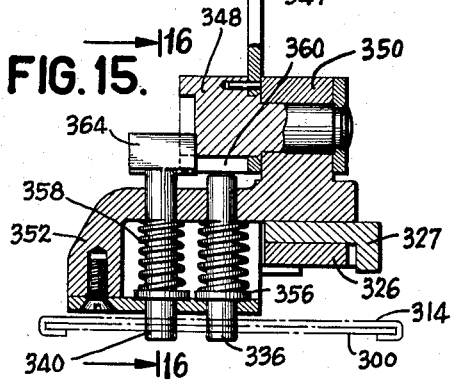
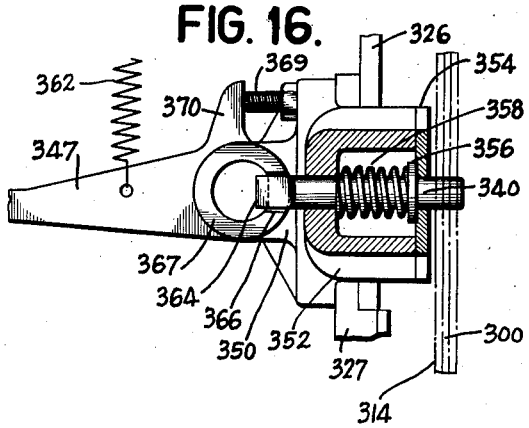
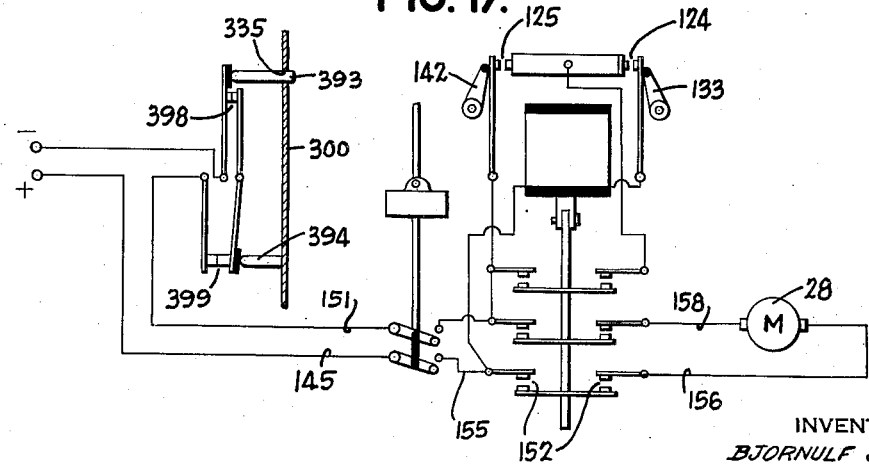
INVENTOR
*BJORNULF JOHNSEN*
BY
Arton and Griswold
ATTORNEYS Sept. 13, 1938.  B. JOHNSEN  2,129,770
LIQUID DISPENSING
Filed Dec. 15, 1937  7 Sheets-Sheet 7
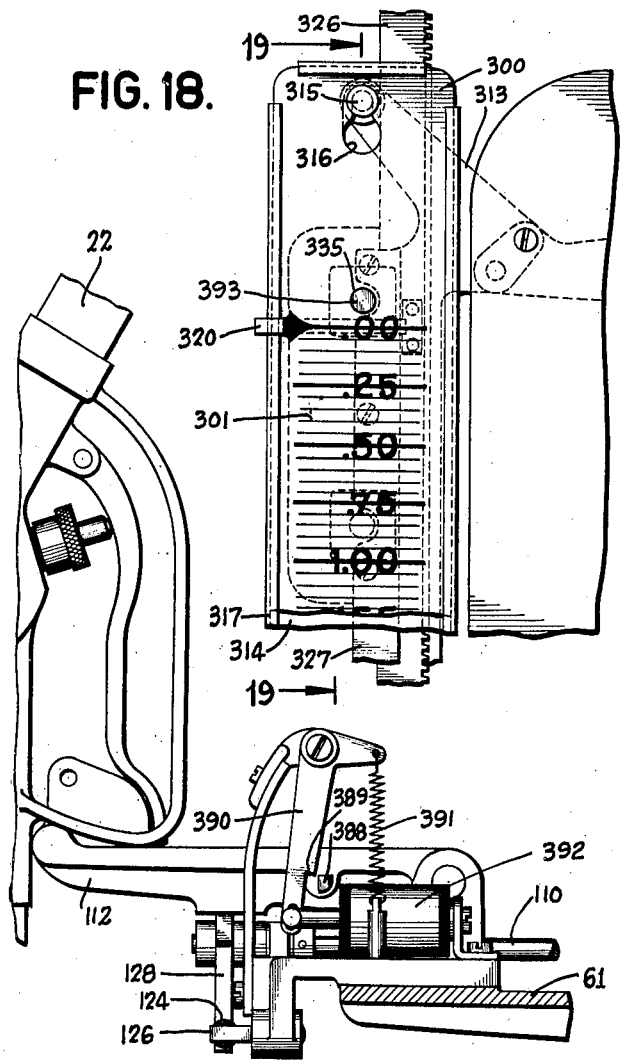

Patented Sept. 13, 1938

2,129,770

UNITED STATES PATENT OFFICE 2,129,770

LIQUID DISPENSING

Bjornulf Johnsen, Summit, N. J.

Application December 15, 1937, Serial No. 179,837

17 Claims. (Cl. 221—95)

This invention relates broadly to fluid dispensing devices such as are adapted to dispense gasoline and other liquid fuels at roadside service stations and the like, of the kind in which the elevation of the fluid, as from a tank, is automatic, for instance, by means of a motor driven pump, whereby the delivery of fluid is continuous and the attendant, instead of operating a pump handle to serve the fluid may stand at the vehicle tank where he can see exactly how much the tank will hold and serve it without spilling.

It is customary to provide this type of liquid dispensing apparatus with a card to be displayed somewhere on the casing adjacent the clock, the card being used to compute the price of any amount of gasoline or other liquid dispensed from the device. The objections to this method of computation are the liability that the cards may not be supplied at the proper time, and also that the figures on the computing card are so small that the customer purchasing gasoline from a dispensing station cannot see the numerals from his automobile, there being grave dangers of error in either case. There is a further objection that the prices on these cards are only for full gallon units, and if a fraction of a gallon is dispensed there is no way of accurately determining the cost of this amount. Also, in meter pumps there is no positive way to dispense only a unit, and so in case the registering hand of the clock overruns the unit measure, either the customer has to pay an estimated amount, or the service station owner has to lose this fraction of a unit to the customer. It has been proposed to provide a liquid dispensing apparatus which itself registers both the amount of liquid dispensed and also registers the total price of such liquid dispensed, the means being adjustable at the liquid dispensing apparatus to correspond to any price variations of units dispensed. However, such dispensers have involved relatively expensive and complicated automatically actuated computers for indicating the quantity of liquid dispensed and the price charged or selected for the total amount of liquid so dispensed.

In copending applications Serial No. 141,013 and Serial No. 141,014 there is disclosed and claimed a liquid dispensing device which is adapted to indicate not only the number of units of liquid dispensed and the fractions of a unit thereof but also the total price of the liquid dispensed without requiring expensive and complicated mechanism by an indicator which is movable proportionately to the flow of liquid dispensed travelling over indicia, such as a chart, showing at least the instant price of the quantity dispensed. Moreover, devices are provided which permit replacement of the charts as the price per unit of measure changes in a construction which normally cannot be tampered with.

The primary object of the present invention is to assure that the price indicating indicia, with respect to which the price indicator moves, is properly positioned in the interest of accuracy in the indication of the price. The customer must pay for the total quantity of liquid dispensed in a given transaction. To this end, the liquid dispensing device is so constructed and arranged as to be incapable of operation unless the indicia are properly located with respect to a predetermined position or range of travel of an indicator. More particularly, the operation of the liquid dispensing device, in the delivery of liquid is prevented or controlled unless, say, the zero reading position on the chart corresponds with a fixed or predetermined or initial position of the indicator.

It is also an object of the invention to provide simple and effective actuating mechanism for the indicating instrumentality, the principles of which are applicable to any fluid dispensing device having an element movable in proportion to the delivery of fluid.

In United States Patent No. 2,028,102, the nozzle, by which the fluid is delivered, say, to the tank of a motor vehicle, is illustrated as carried upon a movable support when in inactive position or against a movable member which it retains in inactive position. In United States Patent No. 2,084,288, so soon as the nozzle is lifted from its support, the fluid flow establishing means is placed in a condition whereby its operation may be maintained. At the same time, the return of the indicating devices to initial position is initiated and when the indicating devices reach initial position, the flow establishing means is enabled to function to permit the delivery of fluid to the meter. After the desired quantity of fluid has been delivered and the nozzle returned to its support, the flow establishing means is caused to cease operation. The indicating means retains the indication of the number of units of measure of fluid delivered until the next transaction. It has also been proposed heretofore to provide a fluid dispensing device in which the attendant effects the flow of fluid by pulling on the hose. This has usually been accomplished by connecting the hose with actuating devices for a switch in the circuit of electrically operated flow establishing devices whereby the circuit is closed when the attendant pulls on the hose, and the circuit is opened when no pull is exerted on the hose. In United States Patent No. 2,028,102 there is shown and claimed the control of the operation of a fluid dispensing device of the type illustrated in the copending applications by a controlling device rendered operative by a pull on the delivery hose.

The present invention is shown as adapted to the mechanism of the patent.

The invention also seeks a fluid dispensing device which shall be practical from the standpoint of ease and accuracy of manufacture and convenience and durability in use.

These and other objects of the invention and the means for their attainment will be more apparent from the following detailed description, taken in connection with the accompanying drawings illustrating one embodiment by which the invention may be realized, and in which:

Figure 1 is a view illustrating, in elevation, the upper portion of a fluid dispensing standard provided with means whereby not only the number of units of fluid dispensed is indicated to the purchaser but also the total money value of the dispensed fluid, a portion of the standard being broken away to expose details of the fluid flow establishing means and showing the nozzle support;

Figure 2 is a fragmentary elevational view showing the quantity and value indicating mechanism, parts being broken away to show details of construction;

Figure 3 is a transverse sectional view showing actuating mechanism of the fluid dispensing device, taken in the plane indicated by the line 3—3 of Figure 1;

Figure 4 is a fragmentary vertical sectional view taken in the plane indicated by the line 4—4 of Figure 3;

Figure 5 is a fragmentary vertical sectional view taken in the plane indicated by the line 5—5 of Figure 3;

Figure 6 is a fragmentary vertical sectional view taken in the plane indicated by the line 6—6 of Figure 2;

Figure 7 is a detail view, in side elevation, looking in the direction indicated by the arrows 7—7 in Figure 6;

Figure 8 is a detail view in section taken on the line 8—8 of Figure 6;

Figure 9 shows details of the actuating mechanism controlled by the nozzle support;

Figure 10 is a detail view in section taken in the plane indicated by the broken line 10—10 of Figure 9 and showing one position of the parts;

Figure 11 is a view similar to Figure 10 showing another position of the parts;

Figure 12 is an enlarged view of details of the locking device of Figures 10 and 11; and Figures 13–16 are detail views of chart positioning devices at various positions.

Figure 17 is a wiring diagram.

Figures 18 through 20 show a modified form of construction using electrical means instead of mechanical means to control the flow establishing means.

While the invention is equally applicable to any fluid dispensing device wherein a member is movable in proportion to the amount of fluid delivered through a conduit, it is here described, for convenience, as incorporated in a fluid dispensing device such as illustrated in Patent No. 2,028,102 in which a dispensing standard or housing 20 of any convenient shape, is adapted to support and contain the devices for elevating liquid from a tank (not shown), say, beneath the ground and measuring it for delivery from a valve controlled nozzle 22 on the end of a hose 24 into, say, the fuel tank of a motor vehicle. Flow establishing means, such as a pump 26, driven by the motor 28, elevates the liquid, in this instance, through the pipe 30 to meter 32 from which the liquid passes by a pipe 34 to the connection 36 for the hose 24.

In the front of the housing and at a desirable elevation where it may be easily visible, or, if desired, in both the front and back walls thereof, the housing 20 is formed with openings 40 by which the dial 46, indicating the number of units of measure of fluid delivered from the nozzle 22 is visible. Behind this opening 40 is an index finger 47 indicating the initial or zero position of the dial 46. Also formed in the casing is an opening through which the stub shaft 54 extends and upon which a pointer 56 is mounted. The pointer 56 is adapted to travel over a dial 60 to register on a larger scale, fractions of the units of measure of the fluid delivered.

The mechanism actuating the device indicating the units of measure of the fluid delivered from the nozzle 22 is supported in any convenient manner within the housing 20. Bearing frames 65 are suitably braced and spaced by the spacing rods 68 which pass through the frames 65.

Journalled preferably substantially centrally of the bearing frames 65 is a freely rotatable shaft 69 on the outer ends of which, outwardly of the frames, are gears 72 each carrying a dial 46. Also journalled in the bearing frames 65, in a lower part thereof, is the jack shaft 74.

Obviously, a hand on the shaft 69 may travel over the face of a fixed dial to indicate the units of liquid dispensed and similarly the shaft 54 may be concentric with the shaft 69, as is common in existing types of fluid dispensing devices, in which event the hand 56 will indicate the fractions of the units of measure of the liquid dispensed.

During the delivery of the fluid, its flow through the meter 32 causes a rotation of the meter shaft once for each unit of measure of fluid passing therethrough. The upper end of the meter shaft 76 carries a bevelled pinion 80 which meshes with a bevelled gear 82 loosely mounted on the transverse jack shaft 74 to which it may be clutched to cause the jack shaft 74 to be rotated by the meter 32 and from which it may be declutched to permit the indicating devices to be moved, say, in the opposite direction independently of the meter shaft, in restoring them to zero or initial position. The ratio of the bevel pinion 80 and gear 82 is such that the jack shaft 74 makes one-half revolution for each unit of measure of fluid delivered. The jack shaft 74 drives, through a pinion 84 on its end, outwardly of the bearing frame 65, the gear 72. Thus the gear 72 is rotated from the meter shaft 76 in direct relation to the number of units of measure of fluid passing through the meter 32. Also carried with the jack shaft 74 is another gear 86 meshing with the pinion 88 on the stub shaft 54 whereby the split gallon pointer 56 is rotated.

While various types of clutch means may be adopted between the meter shaft 76 and the jack shaft 74, a clutch which is particularly effective for the purpose at hand is illustrated in United States Patent No. 2,028,102.

The clutch operating collar 106 is actuated by a forked clutch operating lever 108 (Figure 3), loosely mounted upon a transversely extending operating shaft 110. The rotation of this operating shaft 110 through a predetermined angle to clutch and declutch the jack shaft is controlled by the weight of the nozzle 22 on its support through an intermediate instrumentality described more in detail in the patent.

The shaft 110 is normally urged to turn in a counter-clockwise direction by a spring 124 connected at one end to a fixed lug 126 and at its other end to the end of a downwardly directed arm 128, fixed on the shaft 110. This spring 124 is of sufficient strength to turn the shaft 110 and cause the disengagement of the clutch when the nozzle 22 is off its support 112, but is insufficient to raise the arm 112 against the weight of the nozzle 22.

As illustrated in the patent, the purpose of disconnecting the jack shaft 74 from the meter shaft 76 is to permit the indicating means 46 and 56 to be reset to initial or zero position preparatory to recording the delivery of fluid in the next transaction. In order to prevent a dishonest operator from stopping the indicating means before such means has travelled all the way back to initial or zero position and commencing to deliver fluid with the dial registering from that advanced point, latching means 136 are provided which engage the clutch operating lever in clutch releasing position and hold it in such position until the indicating means reaches initial position, when the clutch operating lever is released. It is also not until such time that the pump is permitted to operate.

When the weight of the delivery means is moved from the support, the spring 124 causes shaft 110 to rotate in a counter-clockwise direction, the rotation of arm 134 raises the latching pawl 136, carrying the lever arm 130 with it to also turn, in a counter-clockwise direction, the arm 108 to throw the clutch and release the jack shaft 74 from the meter shaft during the time that the indicating means are moving to zero position.

It will be readily appreciated that when the jack shaft 74 is released from the meter shaft 76 by the separation of the clutch elements 90, 92 upon removal of the nozzle 22 from its support 112 that the indicating means are freely movable in either direction, the jack shaft 74, of course, turning with the movement of the indicating means. Provision is made for returning the indicating means to initial or zero position when so released.

Fixed on the shaft 69 is a pinion 146 in mesh with a segmental gear 148, pivoted on a fixed part of the framework. At the right, as viewed in Figure 3, the segmental gear is provided with a pin 156 and at its other end with a pin 166. In this figure, the gear is shown as at its initial or zero position.

Power means is provided for returning the indicating means to initial position. A spring or other tension device may be utilized. As shown, however, the shaft 69 is provided with a sheave 66 fixed thereon, upon which is wound, as the dials turn away from initial position, a tape or cable 116 to which is attached a counterweight 117 vertically movable in a tube or guide 157 carried by the platform 61. When the shaft 74 is clutched to the meter shaft 176 and rotated thereby, the shaft 69, of course, rotates from zero to effect registration of the number of units of measure and the value of the fluid delivered. This rotation, with the consequent rotation of the pinion 146 moves the segmental gear 148 about its pivot and at the same time winds up the tape on the sheave against the action of gravity on the weight 117 and stores up energy by the elevation of the weight. When the jack shaft 74 is disconnected from the meter shaft 76, the weight 117 commences to descend thereby rotating the shaft 69 in the opposite direction back to zero. At the same time, the segmental gear 148 is turned about its pivot in the opposite direction by the rotating pinion 146 back to its initial position.

Upon the return of the indicating means to initial position the reconnection of said indicating means with the driving means therefor is effected so that the indicating means may be again moved to measure the units of fluid delivered.

So soon as the nozzle is lifted from its support, the shaft 110 is adapted to be rotated under the influence of the spring 124 and this causes the arm 192 fixed thereon, to be turned in a counter-clockwise direction. This downward movement of the arm 192 permits the spring 188 to draw the link 177 which is connected with the arm 182 of a switch controlling means pivotally mounted on the control box 38, the arm 133 of which controls the contacts 124. The contacts 124 are thus closed immediately upon the removal of the nozzle from its support and thus one of the two switches in the holding circuit, Figure 17, is closed.

Provided the charts are properly positioned, the holding circuit is completed so that the pump can start delivering fluid as soon as the indicating means are restored to zero position. The rocking lever 170 has connected to its end the link 175 leading to one arm 141 of a switch actuating bell crank 141, 142 pivotally mounted on the motor control box containing the circuit closers and auxiliary devices of the motor circuit. When this link is advanced by the movement of the lever 170 under the influence of the spring 173, the contacts 125 are opened. The contacts are held open or permitted to separate by virtue of their inherent resiliency. So soon as this switch 125 is closed by contact of pin 166 with the arm 174 on shaft 67 carrying arm 170, the holding switch 124, being held closed, the holding circuit is established. Current then flows from the main 145, (assuming switch 200 is closed) through line 150, solenoid winding 149, through contacts 124, line 146, contacts 125, line 147 to the main 151. This circuit energizes the electromagnet 149 thereby closing a series of contacts, to wit, contacts 152 of the motor circuit and a pair of contacts 153 in a holding circuit. In the holding circuit thus established, current flows from the main 145 through line 150, solenoid winding 149, contacts 124, line 146, line 154 and through the closed contacts 153 and line 147 to the negative main 151. The holding circuit remains established so long as contacts 124 remain closed and even though contacts 125 are open by the movement of the indicators from zero in recording the units of fluid delivered by the pump and the price thereof. (The movement of the pin 156 away from the arm 174 permits the spring 173 to advance the line 175 and open the contacts 125.)

At the same time, the motor circuit is established since current flows from the main 145, line 155, contacts 152, line 156 to the motor 28, line 158, contacts 152 to the negative main 151.

When the indicator starts to move away from initial position, the lever 170 and its link 175 moves under the influence of spring 173 and the contacts 125 are opened. However, due to the holding circuit, the solenoid remains energized to keep the motor circuit closed and the motor continues to run until the contacts 124 are opened on the return of the nozzle to its support, the depression of the supporting lever 112, and with it the arm 122, of course, rotating the shaft 110 and arm 192 in a clockwise direction, elevating the line 177 and opening the circuits 124. This deenergizes the solenoid and the motor circuit is broken and the motor comes to rest stopping the pump.

During the delivery of fluid, as the meter shaft 76 rotates, the jack shaft 74 is rotated, which in turn rotates the gears 72 by means of the pinions 84, the pinions 84 and annular gears 72 being so proportioned that the numerals representing the several units of measure are brought past the index as units of fluid are delivered by the pump. While at the same time the stub shaft 54 is also rotated from the jack shaft 74 to indicate fractions of each unit as they are delivered. If at any time while the pump is operating, the valve should be closed and the pressure built up within the system, such pressure, after a predetermined maximum is reached, will open a suitable and well known pressure relief valve and permit the fluid to return to the reservoir from which it has been drawn through the pipe 38.

The construction just described results in the continuous operation of the pump and the maintenance of liquid under pressure in the hose 24 so long as the nozzle 22 is off its support 112, since the holding circuit is not interrupted until the switch 125 is opened by the return of the nozzle to the support, as has been explained. In principle, so much of the structure as has been described is claimed broadly in Patent No. 2,084,288 and in copending application Serial Number 536,108, although details of construction differ.

In accordance with this invention, in addition to indicating, as by the relatively movable fluid flow indicating means, the quantity of fluid being dispensed, it is proposed to give an indication of the value of the fluid as it is being dispensed so that a customer may purchase fluid to an even monetary unit, for instance, he may purchase an even dollar's worth of gasoline or read the monetary value of the quantity of fluid delivered to him, that is, the amount he is required to pay for, say, an exact amount of fluid, for instance, ninety-three cents for say five gallons of gasoline.

Referring first to Figure 1, it will be observed that an indicator, such as the chart 300, has been shown in close proximity to the window 40 and fractional gallon indicator 60. This chart is graduated to show monetary units, and, for the purpose of illustration, a scale, so to speak, is graduated to represent fractional units of money. In this instance, each scale graduation 301 represents five cents, between 0 and $3.55, the value of every fifth graduation from the index, .00 being indicated by indicia as $0.25 $0.50, $0.75, etc. It will be noted that the chart illustrated is designed to represent the instant value of the units of measure delivered where one unit, a gallon, is valued at 18½¢ per gallon.

On the opposite side of the indicators 40, 60 showing the quantity delivered there may be disposed, if desired, another chart 302 giving the cost, figured on the same unit cost, to wit, 18½¢ per gallon, of different quantities of fluid delivered which may be used to compute the price of any amount of gasoline or other liquid delivered.

The charts 300 and 302 are, of course, replaceable so that different corresponding charts 300 and 302 may be substituted when the price per unit of volume changes.

The charts 300 and 302 may be mounted in the casing 20, Figure 1, on the rear of frames 303 and 304, respectively, removably mounted in apertures 306, 307, respectively, in the face of the casing of the dispensing device, each being formed with an aperture 309, 310, respectively, shown as of generally elongated form and closed by some transparent medium 311, such as glass. The frames 303, 304 are removably mounted on the casing as by the buttons 312.

Behind the glass panel 311 and within the casing is mounted a supporting frame 313 suitably supported on or integral with a convenient part of the casing frame 65. The frame carries studs 315 on which the charts are supported. The charts may be slid from below within grooves formed by reversely bending the side edges and top edges of a plate 314, as at 317, for support therein. The charts 300 are conveniently formed with keyhole slots 316 for support on the studs.

An index or pointer 320 is so disposed as to travel over the scale 301 in proportion to the quantity of liquid dispensed. It is contemplated that the index or pointer 320 shall be moved by any convenient movable part of any type of fluid dispensing device, the movement of which part is proportional to the quantities of liquid dispensed. As shown, the pointer is conveniently formed as a reversely bent piece, of suitable rigidity, carried on a rack 326 vertically sliding in a guideway 327 conveniently carried on the frame in which is journalled the shaft 328 which is shown as on the side proximate the nozzle support 112. Shaft 328 carries, at each end, a pinion 329 meshing with and reciprocating the rack 326 on each side of the machine.

The pinion 329 meshes with an idler gear 330 rotatably mounted on the frame and driven by a gear 331 fixed on the shaft 69 so that, as the shaft 69 rotates in proportion to the amount of fluid delivered and indicated by the liquid flow indicator 46, the pointer 320 moves proportionally thereto over the scale on the chart 300. Also when the indicator 46 returns to its initial position by a rotation of shaft 69 in the opposite direction, the gears 329, 330, 331 rotate in the opposite direction to move the rack 326 in the opposite direction to return the pointer to its initial position.

So much of the price indicating mechanism as has been described is shown, described and claimed in copending application Sr. No. 141,013 filed May 6, 1937. It is sought, by the present invention, to require that the chart be properly positioned so that the initial or zero reading on the chart corresponds to the initial or zero position of the price indicator hand 320 and of course, to the initial or zero position of the dials 46 and 60. Referring, first, to Figure 6, it will be observed that the chart 300 is provided with an aperture 335. When the chart is properly positioned, a plunger 336 is adapted to enter the aperture 335 and this plunger is so related to mechanism, hereinafter to be described, which prevents the operation of the fluid dispensing device unless the plunger 336 is in advanced position through the aperture 335 in the chart. Closely associated with this plunger is a second plunger 340 which in its advanced position prevents the operation of the dispensing device and which will assume this advanced position if no chart is in position but which is held in its position by a chart and is thus inoperative. These plungers control or actuate means which prevent the operation of the fluid flow establishing means 26.

Referring to Figures 4 and 5, it will be observed that the nozzle support 112 has an extending arm 342. The arm 342 is connected on the opposite side of its fulcrum, by a link 343 to arm 344 fixed on a sleeve 345 loose on the frame rod 68. Also fixed on the sleeve 345 is an arm 346 adapted to depress a finger 347 having a rotatable locking member 348, journalled in a frame member 350 supported in any convenient fashion on the frame of the apparatus so that as the finger 347 is depressed, the locking member 348 is rotated about its axis to control the plungers 336 and 340.

The frame member 350 has a forwardly extending portion 352 which supports an apertured plate 354. The apertures permit the two plungers 336 and 340 to pass therethrough. The two plungers each carry a collar 356 which limits forward movement of the plungers through the apertures and are normally pressed to a forward position by means which are conveniently shown as coil springs 358.

The locking member 348 is provided with a recess 360 so disposed that when the finger 347 is in its normal position, i. e., its outward position, drawn there by the action of the spring 362, the plunger 336 may be retracted or pushed inwardly because its inner end may enter the recess 360 thereby permitting the chart to be removed from the machine for the purpose of changing prices, as shown in Figure 14. When, however, a chart is in position, with the positioning aperture 335 in register with the plunger 336, the spring 358 urges the plunger outwardly of the recess 360 and permits the locking member 348 to be rotated, as under the influence of the nozzle support in moving to raised position to initiate the operation of the flow establishing means. When, however, no chart is in position, the dispensing of fluid is prevented by the plunger 340 since the plunger 340 may be advanced, as shown in Figure 15, bringing a head 364 thereon within a slot 366 in an annular flange 367 within which the head 364 normally moves. In this position, of course, the finger 347 is prevented from being depressed thereby preventing the shaft from being rocked and thereby preventing the nozzle support from being raised to initiate the operation of the flow establishing means. It will be observed, Figures 7 and 8, that the recess or slot 366 may be stopped in the rotation of the locking member 348 about its axis, at a position in register with the end of the plunger by the adjusting screw 369 which serves as a stop for an arm 370 carried by the finger 347.

A modification of the invention is illustrated in Figures 9 through 12 wherein like parts have corresponding reference characters affixed thereto. As before the nozzle support 112 is connected through the link 343 with an arm 344 fixed on the sleeve 345 which in this instance is loose on the drive shaft 328 and also mounted on this sleeve is the arm 346. Mounted above the rod 68, on some convenient part of the frame, is a bell crank lever 373, 374, the end of the arm 373 lying in the path of movement of the arm 346. The bell crank is normally rotated in counter-clockwise direction as viewed in Figure 10 by a spring 362.

The end of the arm 374 is apertured to adjustably receive the end of a plunger 376 having a head 378 defined by a peripheral groove 379. When the chart is in its proper position the aperture 335 therein is in register with the head 378 thereby permitting, when the nozzle hook 112 is raised, the advance of the plunger 76 therethrough. The advance of this plunger may be prevented, however, if no chart is in position, by a reciprocating latching member 380 slidable on the frame and carrying at its upper end a head 382 adapted to overlie the upper end of the chart and be positioned thereby. A spring 384 normally tends to draw this latching slide 380 downwardly. The end of the latching slide, if no chart is in position, in its lowermost position, is adapted to enter the groove 379 in the plunger 376 (Figure 12) under the influence of the spring 384. This locking takes place immediately upon the removal of a chart and similarly the chart cannot be removed unless the nozzle hook support 12 is in its lowermost position rendering the fluid flow establishing means inoperative. Thus if the plunger 376 is retracted in order to permit the removal of the chart, when the chart is removed the locking slide 380 is moved downwardly into the locking position thereby preventing the initiation of the operation of the flow establishing means until a new chart is inserted which raises the latching member 382. Of course, the new chart cannot be properly placed in position unless the plunger has advanced through the aperture 335 thus insuring the chart being in proper position.

Still another modification of the invention is illustrated in Figures 18, 19 and 20 wherein the elevation of the nozzle support 112 is prevented by latching means electrically actuated and controlled. The nozzle support 112 carries a lug 388 adapted to be engaged by a shoulder 389 on a lever 390 pivoted above the nozzle support. The lever is normally rocked in a clockwise direction as viewed in Figure 18 by a spring 391 but is drawn in the opposite direction to engage the lug and prevent the nozzle hook support from being raised by an electro-magnet 392 adapted to be energized from any source of current, as shown in Figure 20, when the circuit is completed. The circuit is completed by either one of a pair of plungers 393 or 394 which correspond in their function to the plungers 336 and 340. Mounted on the frame in rear of the chart are a pair of bearing members 395, each of which contains one of the plungers 393 or 394, these plungers being adapted to be advanced by means of a spring 387 and controlled in their advanced position by collars 396. The plungers extend rearwardly, outwardly of the casing 395 but within a cover or housing 397 within which is mounted the spring contacts 398 and 399. The leaf spring contacts 398 are actuated by the plunger 393 in its retracted position and the contacts 399 are actuated by the plunger 394 in its retracted position. Plunger 393 is illustrated as adapted to close the contacts 398 to complete the circuit through the solenoid as illustrated in Figure 20 and plunger 394 is illustrated as so arranged as to open the contact 399 when the plunger is in retracted position and to permit the contact to close when the plunger is in advanced position. The plunger 393 is adapted to pass through the aperture 335 in the chart when the chart is in proper position and when so advanced permits the contact 398 to open deenergizing the solenoid 392 and permitting the spring 391 to rock the locking lever 390 out of engagement with the lugs 388 to permit the raising of the nozzle hook support. Conversely, if the chart is not in proper position the plunger cannot advance and the contacts 398 are therefore closed energizing the solenoid and preventing the raising of the nozzle hook support 112. Similarly, if there is no chart in position the plunger 394 is advanced permitting the contact 399 to close to energize the solenoid 392 and prevent the nozzle hook from being raised. When the chart is in position, the plunger 394 is retracted thus opening the contact 399 and deenergizing the solenoid 392 and permitting the unlatched nozzle hook support to be raised.

A modification of the invention of Figure 19 is illustrated in Figure 17 wherein the two contacts 398 and 399 are in the line 151 energizing the circuit closing devices of the flow establishing means. Thus, when the chart is in the proper position the plunger 393 is advanced to permit the contacts 398 to close and energize the fluid flow establishing means. But if the chart is not in proper position, so that the plunger 393 is prevented from advancing to its proper position, these contacts 398 are open and the circuit is open and the flow establishing means cannot operate. Similarly, if no chart is in position, while the plunger 393 is also permitted to advance thus opening the contact 399 and interrupting the circuit to the flow establishing means and preventing their operation.

Obviously, the proportion of parts, such as the range of movement of the pointer and the ratio of the gears, is such as to permit indications of price to be given over any reasonable range of units of measure of fluid delivered and, of course, the travel of the pointer 320 is constant. The scales 301 on the chart 300, therefore, are of such length and the spaces between scale graduations are so proportioned as to cover price variations at the designated price per unit of volume and a different scale is required for each price per unit the scale graduations of which are of the required length to show the correct value for each unit of liquid delivered.

It will thus be seen that the price indicating pointer 320 moves over the chart 300 to indicate the instant value of the volume delivered at a given instant as the volume indicator 46 moves with respect to its initial position so that not only does the operation of the meter serve to advance the pointer but the restoring of the volume indicator to initial position results in the restoration of the price indicator to its initial position. Likewise, the operation of the fluid flow establishing means is prevented until the price indicator is restored to initial position. Furthermore, when a chart is in its proper position, the fluid flow establishing means may be caused to operate but if the chart is in a position other than its proper position, whereby a correct indication of the price is not given, the operation of the flow establishing means is prevented. Similarly if a chart has been removed from the apparatus, whereby no price indication is available to the purchaser, the fluid flow establishing means is similarly prevented from operation.

Various modifications will occur to those skilled in the art in the disposition and configuration of the component elements going to make up this invention as a whole as well as in the selection and/or combinations of certain of the features independently of others or the substitution therefor of other means accomplishing the same result, and no limitation is intended by the phraseology of the foregoing description or illustrations in the accompanying drawings, except as indicated in the appended claims.

What is claimed is:

1. In fluid dispensing apparatus having fluid flow establishing means, fluid metering means, a replaceable chart visibly carried with the apparatus to indicate the instant value of the fluid delivered, a pointer movable over the chart proportionately to the quantity of liquid passing through the metering means and means to prevent the operation of the fluid flow establishing means if the chart is not properly positioned in the apparatus.

2. In fluid dispensing apparatus having fluid flow establishing means, fluid metering means, a replaceable chart visibly carried with the apparatus to indicate the instant value of the fluid delivered, a pointer movable over the chart proportionately to the quantity of liquid passing through the metering means and means to prevent the movement of the pointer if the chart is not properly positioned in the apparatus.

3. In fluid dispensing apparatus having fluid flow establishing means, fluid metering means, a replaceable apertured chart visibly carried with the apparatus to indicate the instant value of the fluid delivered, a pointer movable over the chart proportionately to the quantity of liquid passing through the metering means and means to prevent the operation of the fluid flow establishing means if a chart is not properly positioned in the apparatus comprising a member movable in the aperture.

4. In fluid dispensing apparatus having fluid flow establishing means, fluid metering means, a replaceable chart visibly carried with the apparatus to indicate the instant value of the fluid delivered, a pointer movable over the chart proportionately to the quantity of liquid passing through the metering means and means to prevent the operation of the fluid flow establishing means if a chart is not properly positioned in the apparatus comprising a member rendered inoperative by a chart in proper position.

5. In fluid dispensing apparatus having fluid flow establishing means, fluid metering means, means to initiate the operation of the flow establishing means, a replaceable chart visibly carried with the apparatus to indicate the instant value of the fluid delivered, a pointer movable over the chart proportionately to the quantity of liquid passing through the metering means and means to prevent the operation of the fluid flow establishing means if a chart is not properly positioned in the apparatus comprising a movable member controlling the initiating means, the movement of said member being controlled by a chart.

6. In fluid dispensing apparatus having fluid flow establishing means, fluid metering means, means to initiate the operation of the flow establishing means, a replaceable apertured chart visibly carried with the apparatus to indicate the instant value of the fluid delivered, a pointer movable over the chart proportionately to the quantity of liquid passing through the metering means and means to prevent the operation of the fluid flow establishing means if a chart is not properly positioned in the apparatus comprising a pair of plungers, means to urge said plungers into the space occupied by the chart, the aperture in the chart being in register with one of the plungers and means controlling the initiating means rendered operable by the plungers.

7. In fluid dispensing apparatus having fluid flow establishing means, fluid metering means, means to initiate the operation of the flow establishing means, a replaceable apertured chart visibly carried with the apparatus to indicate the instant value of the fluid delivered, a pointer movable over the chart proportionately to the quantity of liquid passing through the metering means and means to prevent the operation of the fluid flow establishing means if a chart is not properly positioned in the apparatus comprising a pair of plungers, means to urge said plungers into the space occupied by the chart, the aperture in the chart being in register with one of the plungers and means controlling the initiating means rendered operable by either one of the plungers.

8. In fluid dispensing apparatus having fluid flow establishing means, fluid metering means, means to initiate the operation of the flow establishing means, means to control said initiating means, a replaceable apertured chart visibly carried with the apparatus to indicate the instant value of the fluid delivered, a pointer movable over the chart proportionately to the quantity of liquid passing through the metering means, means to prevent the operation of the fluid flow establishing means if a chart is not properly positioned in the apparatus comprising a pair of plungers one of which is movable through the aperture when the chart is properly positioned and the movement of the other plunger being prevented when the chart is properly positioned and operative connections between the respective plungers and the control means.

9. In fluid dispensing apparatus having fluid flow establishing means, fluid metering means, means to initiate the operation of the flow establishing means, control means therefor, a replaceable apertured chart visibly carried with the apparatus to indicate the instant value of the fluid delivered, a pointer movable over the chart proportionately to the quantity of liquid passing through the metering means, means to prevent the operation of the fluid flow establishing means if a chart is not properly positioned in the apparatus comprising a plunger normally urged toward the chart and means operatively connected with the control means to control movement of the plunger.

10. In fluid dispensing apparatus having fluid flow establishing means, fluid metering means, means to initiate operation of the flow establishing means, control means therefor, a replaceable chart visibly carried with the apparatus to indicate the instant value of the fluid delivered, said chart being formed with an aperture, a pointer movable over the chart proportionately to the quantity of liquid passing through the metering means, a pair of spring pressed plungers, one of which is in register with the aperture when the chart is properly positioned, the other plunger being restrained by a chart in proper position, controlling means for the plungers operative when the plungers are not controlled by a chart in proper position and operative connections between the respective controlling means.

11. In fluid dispensing apparatus having fluid flow establishing means, fluid metering means, means to initiate the operation of the flow establishing means, control means therefor, a replaceable chart visibly carried with the apparatus to indicate the instant value of the fluid delivered, a pointer movable over the chart proportionately to the quantity of liquid passing through the metering means, a plunger the movement of which is controlled by a chart properly positioned in the apparatus, a rotatable member to restrain the plunger and operative connections between the rotatable member and the first named control means.

12. In fluid dispensing apparatus having fluid flow establishing means, fluid metering means, a shaft driven thereby, means to initiate the operation of the flow establishing means, control means therefor, a replaceable apertured chart visibly carried with the apparatus to indicate the instant value of the fluid delivered, a pointer movable over the chart driven by the shaft, whereby the pointer moves proportionately to the quantity of liquid passing through the metering means, a pair of spring pressed plungers, one of which is adapted to pass through the aperture and the other of which is held retracted if a chart is properly positioned in the apparatus and a rotatable member operatively connected with the control means and formed with recesses adapted to receive the respective plungers if the chart is properly positioned.

13. In fluid dispensing apparatus having fluid flow establishing means, fluid metering means, a shaft driven thereby, means to initiate the operation of the flow establishing means, control means therefor, a replaceable apertured chart visibly carried with the apparatus to indicate the instant value of the fluid delivered, a pointer movable over the chart driven by the shaft, whereby the pointer moves proportionately to the quantity of liquid passing through the metering means, a pair of spring pressed plungers one of which is adapted to pass through the aperture and the other of which is held retracted if a chart is properly positioned in the apparatus and a rotatable member operatively connected with the control means formed with recesses adapted to receive the respective plungers if the chart is properly positioned and which restrains the plungers if the chart is not properly positioned.

14. In fluid dispensing apparatus having fluid flow establishing means comprising a circuit including separate circuit closing means, a replaceable chart visibly carried with the apparatus to indicate the instant value of the fluid delivered, metering means, a pointer movable over the chart proportionately to the quantity of liquid passing through the metering means and means to prevent the operation of the fluid flow establishing means if a chart is not properly positioned in the apparatus comprising plungers adapted to actuate the circuit closing means.

15. In fluid dispensing apparatus having fluid flow establishing means comprising a circuit including normally open separate circuit closing means, a replaceable chart visibly carried with the apparatus to indicate the instant value of the fluid delivered, metering means, a pointer movable over the chart proportionately to the quantity of liquid passing through the metering means and means to prevent the operation of the fluid flow establishing means if a chart is not properly positioned in the apparatus comprising plungers adapted to actuate the circuit closing means.

16. In fluid dispensing apparatus having fluid flow establishing means comprising a circuit including separate circuit closing means, one of which is normally open and one of which is normally closed, a replaceable chart visibly carried with the apparatus to indicate the instant value of the fluid delivered, metering means, a pointer movable over the chart proportionately to the quantity of liquid passing through the metering means and means to prevent the operation of the fluid flow establishing means if a chart is not properly positioned in the apparatus comprising plungers adapted to actuate the circuit closing means.

17. In fluid dispensing apparatus having fluid flow establishing means, fluid metering means, means to initiate the operation of the flow establishing means, control means therefor, a replaceable apertured chart visibly carried with the apparatus to indicate the instant value of the fluid delivered, a pointer movable over the chart proportionately to the quantity of liquid passing through the metering means and means to prevent the operation of the fluid flow establishing means if a chart is not properly positioned in the apparatus comprising a plunger movable in the aperture and formed with a recess and a latching member adapted to enter the recess when no chart is in position and formed with a portion engageable by a chart in position to retain the member out of the recess.

BJORNULF JOHNSEN.